United States Patent
Frazier et al.

(10) Patent No.: US 12,427,394 B2
(45) Date of Patent: Sep. 30, 2025

(54) AUTOMATED REFEREE SYSTEM

(71) Applicant: Soccer Park, LLC, Boise, ID (US)

(72) Inventors: Joshua Leland Frazier, Boise, ID (US); Justin Shook, Boise, ID (US)

(73) Assignee: Soccer Park, LLC, Boise, ID (US)

( * ) Notice: Subject to any disclaimer, the term of this patent is extended or adjusted under 35 U.S.C. 154(b) by 374 days.

(21) Appl. No.: 18/062,313

(22) Filed: Dec. 6, 2022

(65) Prior Publication Data

US 2024/0181322 A1    Jun. 6, 2024

(51) Int. Cl.
| | |
|---|---|
| *A63B 71/06* | (2006.01) |
| *A63B 24/00* | (2006.01) |
| *G06N 20/00* | (2019.01) |

(52) U.S. Cl.
CPC ...... *A63B 71/0605* (2013.01); *A63B 24/0021* (2013.01); *A63B 71/0622* (2013.01); *G06N 20/00* (2019.01); *A63B 2024/0025* (2013.01); *A63B 2024/0028* (2013.01); *A63B 2071/0638* (2013.01); *A63B 2220/806* (2013.01); *A63B 2225/20* (2013.01); *A63B 2225/74* (2020.08); *A63B 2243/0025* (2013.01)

(58) Field of Classification Search
None
See application file for complete search history.

(56) References Cited

U.S. PATENT DOCUMENTS

| | | | | |
|---|---|---|---|---|
| 5,312,109 | A * | 5/1994 | Cagle | A63C 19/00 472/92 |
| 11,406,887 | B2 * | 8/2022 | Vollbrecht | A63B 71/0622 |
| 11,568,184 | B2 * | 1/2023 | Oz | G06V 10/751 |
| 2005/0162257 | A1 * | 7/2005 | Gonzalez | A63B 24/0021 377/5 |
| 2009/0005196 | A1 * | 1/2009 | Kessler | A63B 63/00 473/476 |
| 2012/0238383 | A1 * | 9/2012 | Simonnet | A63B 63/004 473/446 |
| 2015/0078175 | A1 * | 3/2015 | Gu | H04W 24/08 370/242 |
| 2015/0235076 | A1 * | 8/2015 | Aimonen | H04N 23/90 348/157 |
| 2015/0264258 | A1 * | 9/2015 | Bervoets | H04N 5/222 348/36 |

(Continued)

*Primary Examiner* — Seng H Lim
(74) *Attorney, Agent, or Firm* — Parsons Behle & Latimer

(57) ABSTRACT

Apparatuses, systems, and methods for an automated referee and video system. The system includes a playing field enclosed by walls, one or more doors, and two goals. The system includes a plurality of cameras positioned around the playing field. The system includes a computer-based controller in communication with the cameras. The controller includes a set of computer-based instructions to cause at least one processor to carry out functions associated with one or more modules. A ball detection module tracks a ball on the playing field. An event detection module detects specified events that occur during games. An artificial intelligence (AI) referee module to determine whether a penalty has occurred during a game. The AI referee module may be trained using machine learning. The system may include light emitting diode (LED) wall lights or LED tiles to emit light upon the detection of a specified event and/or a penalty.

17 Claims, 8 Drawing Sheets

(56) References Cited

U.S. PATENT DOCUMENTS

| | | | | |
|---|---|---|---|---|
| 2015/0350606 | A1* | 12/2015 | Khanfor | H04N 23/69 |
| | | | | 348/157 |
| 2016/0136504 | A1* | 5/2016 | Cuttino | A63B 71/0605 |
| | | | | 473/415 |
| 2016/0239001 | A1* | 8/2016 | Chin | G07C 9/00 |
| 2017/0102480 | A1* | 4/2017 | Rosenblum | G06V 10/145 |
| 2019/0017230 | A1* | 1/2019 | White, Jr. | E01C 13/04 |
| 2020/0032534 | A1* | 1/2020 | Crookham | E01C 13/00 |
| 2020/0193671 | A1* | 6/2020 | Tamir | G06T 7/251 |
| 2021/0248415 | A1* | 8/2021 | Oz | G06V 20/42 |
| 2021/0383124 | A1* | 12/2021 | Imes | G06V 10/82 |
| 2022/0038782 | A1* | 2/2022 | Scarbrough, Jr. | |
| | | | | H04N 21/47202 |
| 2022/0272305 | A1* | 8/2022 | Rivera-Placeres | H04N 7/181 |
| 2022/0370884 | A1* | 11/2022 | Vollbrecht | A63B 24/0084 |
| 2023/0009700 | A1* | 1/2023 | Hall | A63B 71/0605 |
| 2023/0410507 | A1* | 12/2023 | Hall | G06V 10/25 |
| 2024/0020874 | A1* | 1/2024 | Stennett | A63B 71/0605 |
| 2024/0161782 | A1* | 5/2024 | Frazier | G06V 40/23 |
| 2024/0337073 | A1* | 10/2024 | Borgers | G09F 23/0066 |

\* cited by examiner

AUTOMATED REFEREE SYSTEM

FIELD OF THE DISCLOSURE

The embodiments described herein relate to an automated referee system for officiating a game occurring on a playing field.

BACKGROUND

Description of the Related Art

As used herein the terms "game" or "games" refers to an observable physical activity, such as soccer, football, field hockey, ice hockey, handball, or the like, and includes matches against two teams, practice sessions, demonstrations, and the like. Games may be played on a field enclosed by walls. It may be hard to schedule an official to referee the game or available referees may not be adequately trained to officiate the game. Further, participants may want to view specific events of the game after the game is done or after the event occurred. Such events may be recorded by spectators. However, the spectator may miss the event, or the recording angle may not be optimal providing a less the desired video. It may be hard to schedule staff to be located at the field to unlock the field and/or turn on lights for each game scheduled. Such a field may not enable a group to show up unscheduled to play a game losing out on potential revenue. Other disadvantages may exist.

SUMMARY

The present disclosure is directed to automated referee and video systems.

One embodiment of the disclosure is a system comprising a playing field enclosed by walls, one or more doors, and two goals. The system includes a plurality of cameras positioned around the playing field. The system includes a computer-based controller in communication with the plurality of cameras, the controller comprising a set of computer-based instructions to cause at least one processor to carry out functions associated with one or more modules. The system includes a ball detection module, wherein the ball detection module controls the plurality of cameras to track a ball on the playing field to create video of a game played on the field. The system includes an event detection module, wherein the event detection module is configured to detect specified events that occur during games played on the playing field. The system includes an artificial intelligence (AI) referee module, wherein the AI referee module determines whether a penalty has occurred during a game occurring on the playing field.

The AI referee module may be trained using machine learning. The system may include one or more light emitting diode (LED) lights on the walls. The one or more LED lights may be configured to emit more than one color of light. The one or more LED lights may emit light if the AI referee module determines a penalty has occurred. The one or more LED lights may emit yellow light if the AI referee module determines a yellow card should be applied for the penalty. The one or more LED lights may emit red light if the AI referee module determines a red card should be applied for the penalty.

The one or more LED lights emit light when the event detection module detects a specified event during a game played on the playing field. The specified event may be a shot on goal, a score, or a skill move. The playing field of the system may include a plurality of tiles. The plurality of tiles may be configured to emit more than one color of light. At least one tile of the plurality of tiles may emit light if the AI referee module determines a penalty has occurred. One tile of the plurality of tiles may emit yellow light if the AI referee module determines a yellow card should be applied for the penalty. One tile of the plurality of tiles may emits red light if the AI referee module determines a red card should be applied for the penalty. The tile may be located under a player that committed the red card penalty and the tile may emit red light until the player leaves the playing field.

The plurality of cameras may include at least one camera positioned above each goal, at least one camera positioned at each corner of the playing field, and at least two cameras positioned at a centerline of the playing field. The system may include at least one video board panel. When the event detection module detects a specified event during a game played on the playing field a replay of the detected specified event may be displayed on the video board panel. The system may include lights and a door lock. A mobile device may be used to operate the lights and the door lock. The computer-based controller may be configured to send video of a game played on the playing field to the mobile device.

One embodiment of the present disclosure may be a method. The method includes recording a game played on a playing field to create a video, the playing field enclosed by walls, one or more doors, and two goals, wherein the game is recorded by a plurality of cameras positioned about the playing field. The method includes tracking a ball while recording the game, wherein a computer-based controller comprising a set of computer-based instructions to cause at least one processor to carry out functions associated with one or more modules. The method includes a ball detection module that controls the plurality of cameras to track the ball on the playing field. The method includes an event detection module for detecting specified events that occur during a game. The method includes an artificial intelligence (AI) referee module, wherein the AI referee module determines whether a penalty has occurred during a game occurring on the playing field.

The method may include emitting light to indicate a penalty, wherein light is emitted from at least one light emitting diode (LED) panel on a wall or a tile on the playing field. The method may include emitting yellow light to indicate a yellow card penalty or emitting red light to indicate a red card penalty. The method may include emitting light to indicate a specified event was detected by the event detection module. The method may include receiving a communication from a mobile device, unlocking a door based on the communication, and turning on lights based on the communication. The method may include sending the video to the mobile device. The method may include replaying a portion of the video on a video panel board upon detection of a specified event by the event detection module. Other embodiments also exist.

Figure 1:
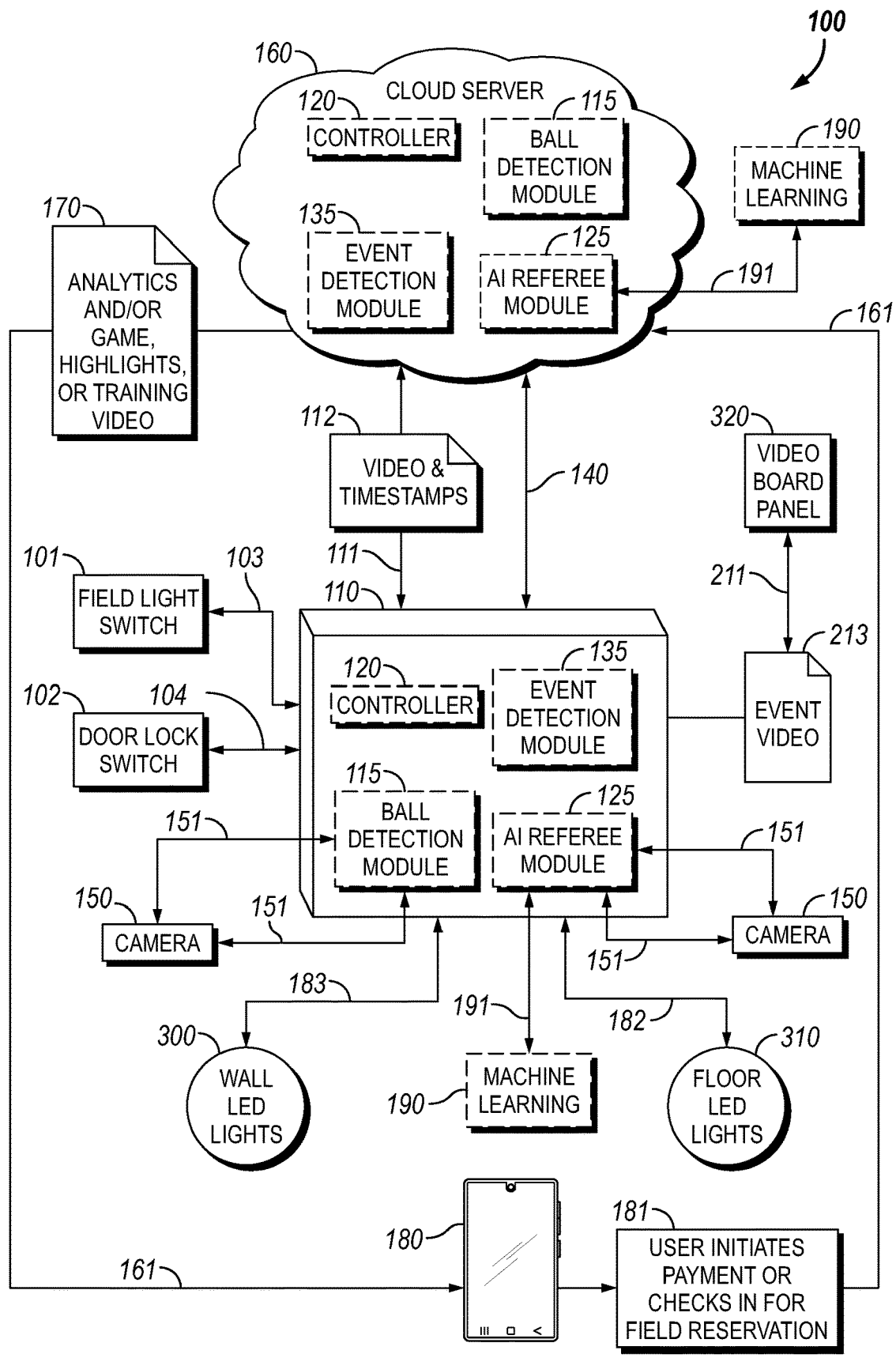
FIG. 1 is a schematic of an embodiment of an automated referee and video system for a playing field.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of an automated referee and video system 100. The system 100 that may be used to officiate and/or create video clips from video of a game played on a playing field 200 (shown in FIGS. 2, 3, and 5-7). As defined above, the game may be, but is not limited to, a soccer game played on a soccer field. However, the system 100 may be used to officiate and/or video and create video clips of various games on various fields as would be appreciated by one of ordinary skill in the art having the benefit of this disclosure. The system 100 includes a computer 110. The field 200 includes a plurality of cameras 150 positioned about the field 200 as discussed herein. The computer 110 may be positioned local to the playing field 200 or may be located elsewhere and be in communication with the plurality of cameras 150. For example, the computer 110 may communicate with the cameras 150 via a wired or a wireless network.

The system 100 includes a controller 120. The controller 120 may be a hardware device of a software program that manages or directs the flow of data between the various elements of the system 100. The controller 120 may be a card, microchip, or separate hardware device as would be appreciated by one of ordinary skill in the art having the benefit of this disclosure. The controller 120 may be comprised of one or more processors located within the computer 110 and/or the controller 120 may control the operation of one or more processors that the controller 120 is in communication with. Likewise, the controller 120 may be located on a cloud server 160, or the like, and may communicate wirelessly with the computer 110 via a communication line 140. The controller 120, which may be a computer-based controller, is in communication with each of the plurality of cameras 150 positioned about the playing field. The controller comprises a set of computer-based instructions to cause at least one processor to carry out functions associated with one or more modules. The system 100 may include various modules that are programmed to perform various tasks or functions within the system.

The system 100 includes a ball detection module 115. The ball detection module 115 may be located on the computer 110 and/or may be located on a cloud server 160. The controller 120 controls the ball detection module 115. The ball detection module 115 controls the plurality of cameras 150 to track a ball on the playing field to create video of a game played on the field 200 and/or to officiate the game via an AI referee module 125. As discussed herein, the ball may be, but is not limited to, a soccer ball and could be a puck, handball, basketball, or the like. The ball detection module 115 may control each camera 150 of the plurality of cameras 150 via a communication lines 151. Communication lines 151 may be wired or wireless as would be appreciated by one of ordinary skill in the art having the benefit of this disclosure.

Video captured by the one or more cameras 150 may be transmitted to the computer 110 and/or controller 120 via communication lines 151. The number of cameras 150 shown in FIG. 1 is for illustrative purposes and may be varied as would be appreciated by one of ordinary skill in the art having the benefit of this disclosure. The computer 110 and/or controller 120 prepares video 112 from captured video received from the one or more cameras 150. The video 112 include time stamps as it is created by the computer 110 and/or controller 120. The computer 110 and/or controller 120 may wirelessly transmit the video 112 to the cloud server 160 via a communication line 111. Alternatively, the computer 110 and/or controller 120 may wirelessly transmit the video 112 to the cloud server 160 via a communication line 140. There may be one or more communication lines between the computer 110/controller 120 and the cloud server 160.

The system 100 includes an event detection module 135. The event detection module 135 may be located on the computer 110 and/or may be located on a cloud server 160. The event detection module 135 is configured to detect specified events that occur during games played on the playing field 200. For example, if the game is a soccer game the event detection module 135 may be programmed to detect a shot on goal, a score, or a skill move. For a soccer game, a skill move comprises, but is not limited to, a Roulette, a Cruyff Turn, an Elastico (also known as a flip flap), a Hocus Pocus, a Nutmeg, an Okocha, a Rabona, a Rivelino, a Fake Pull Back, a Cut, a Matthews Cut, a Rainbow, a Ronaldo Chop, an Inside Hook, a Pull Back V, a Step Over, a Single Lunge, or a Double Lunge. For example, if the game is a football game the event detection module 135 may be programmed to detect a turnover (e.g., an interception or a fumble), a score, or a skill move. A skill move may be, but is not limited to, a Pancake Block, a Pass Deflection, a Sack, a Tackle for Loss, a One Handed Reception, or a Chunk Play. As those of ordinary skill in the art having the benefit of this disclosure would understand other skill moves may be defined for other games as is appropriate.

The system includes wall LED lights 300 and/or floor LED tiles 310. The wall LED lights 300 are in communication with the computer 110 and/or the controller 120 via communication lines 183, which may be wired or wireless. The floor LED tiles 310 are in communication with the computer 110 and/or the controller 120 via communication lines 182. Upon detection of a specified event by the event detection module 135, the computer 110 and/or controller 120 may cause the wall LED lights 300 and/or floor LED tiles 310 to emit light. The computer 110 and/or controller 120 may cause the wall LED lights 300 and/or floor LED tiles 310 to blink or emit a particular color due to the specific event detected by the event detection module 135. Upon detection of a specified event by the event detection module 135, the computer 110 and/or controller 120 may send an event video 213 of the detected specified event to a video board panel 320 via communication lines 211, which may be wired or wireless, to replay the detected specified event on the video board panel 320.

The system 100 includes an AI referee module 125. The AI referee module 125 may be located on the computer 110 and/or may be located on a cloud server 160. The AI referee module 125 works in conjunction with the cameras 150 and the ball detection module 115 to officiate a game being played on the playing field 200. The AI referee module 125 may be trained using machine learning 190 to determine whether an action during a game should be considered a penalty. Machine leaning 190 may be communicated to the AI referee module 125 via communication lines 191, which may be wired or wireless as would be appreciated by one of ordinary skill in the art having the benefit of this disclosure. For example, for the game of soccer the AI referee module 125 may learn how to officiate a game from watching a multitude a premier league games, or the like, to determine what constitutes a penalty, what constitutes a yellow card penalty, and what constitutes a red card penalty. The AI referee module 125 may use video from multiple angles from the plurality of cameras 150 to officiate a game being played on the playing field 200. The use of multiple angles may improve the officiating in comparison to having a physical referee located on the field as the physical referee does not have access to more than has his/her single point of view to determine whether an action constitutes a penalty, a yellow card penalty, or a red card penalty, or the like.

The system 100 is configured for a mobile device 180 to connect to the system 100 via communication lines 161. The mobile device 180 may be used submit an access signal 181 via communication lines 161 to the system 100 to use the playing field 200. For example, the mobile device 180 may send an access signal 181 the pays for use of the playing field 200 or may check in for a previously paid reservation of the playing field 200. Upon submitting the access signal 181 to the system 100, the computer 110 and/or controller 120 activates a door lock switch 102 via a communication line 104 to enable participants to enter the playing field 200 and may also activate a field light switch 101 via communication line 103 to turn lights to illuminate the playing field 200. Communication line 161 may be used to send video and/or video clips 170 of a game and/or detected events to the mobile device 180.

Figure 2:
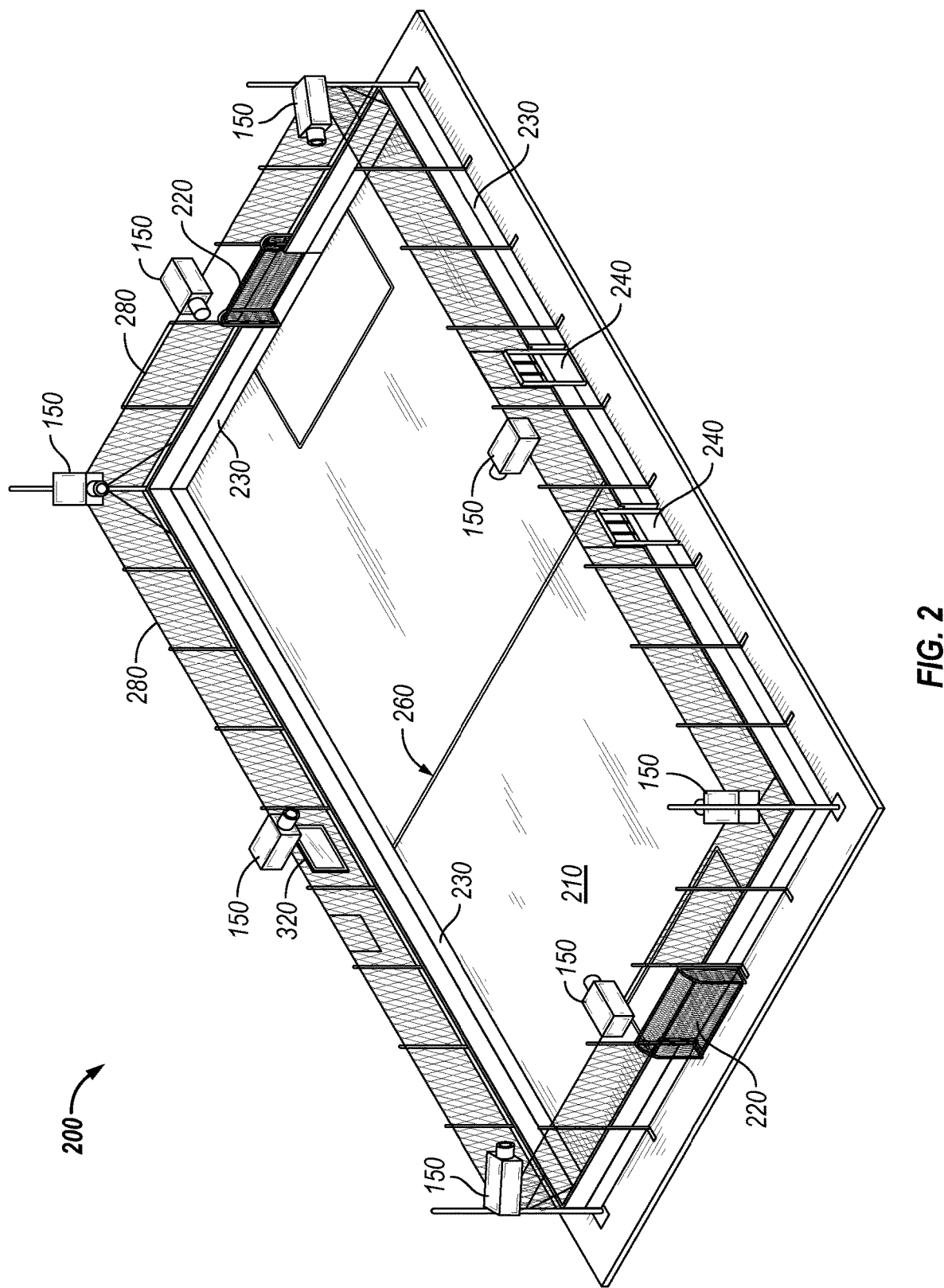
FIG. 2 shows an embodiment of a playing field.

FIG. 2 shows an embodiment of a field 200 that includes a playing surface 210. The playing surface 210 may be grass, turf, ice, or the like, as would be appreciated by one of ordinary skill in the art having the benefit of this disclosure. The field 200 includes one or more doors 240 connected to a plurality of walls 230. The field 200 include two goals 220 with one goal 220 being positioned at each end of the field 200. The field 200 may include a net 280 positioned around the field 200 to potentially keep the ball 201 within the perimeter of the field 200. The field 200 includes a plurality of cameras 150 positioned about the field 200. For example, a camera 150 may be positioned above each goal 220. A camera 150 may be positioned in each corner of the field 200. Two cameras 150 may be positioned at midfield 260 with a camera 150 being positioned on each side of the field 200. More than one camera 150 may be positioned at a location about the field 200, including above the field, such as a "Skycam" or the like, as would be appreciated by one of ordinary skill in the art having the benefit of this disclosure. The number, location, and/or configurations of the cameras 150 are shown for illustrative purposes and may be varied as would be appreciated by one of ordinary skill in the art having the benefit of this disclosure. One or more of the cameras 150 may be controlled by the ball detection module 115 via the controller 120 to track the movement of a ball, record the playing of a game on the field 200, and be used by the AI referee module 125 to automatically officiate a game being played on the playing field 200. Each of the cameras 150 about the field may track the ball 201 and record the game to provide multiple viewing angles of each event detected by the event detection module 135.

Figure 3:
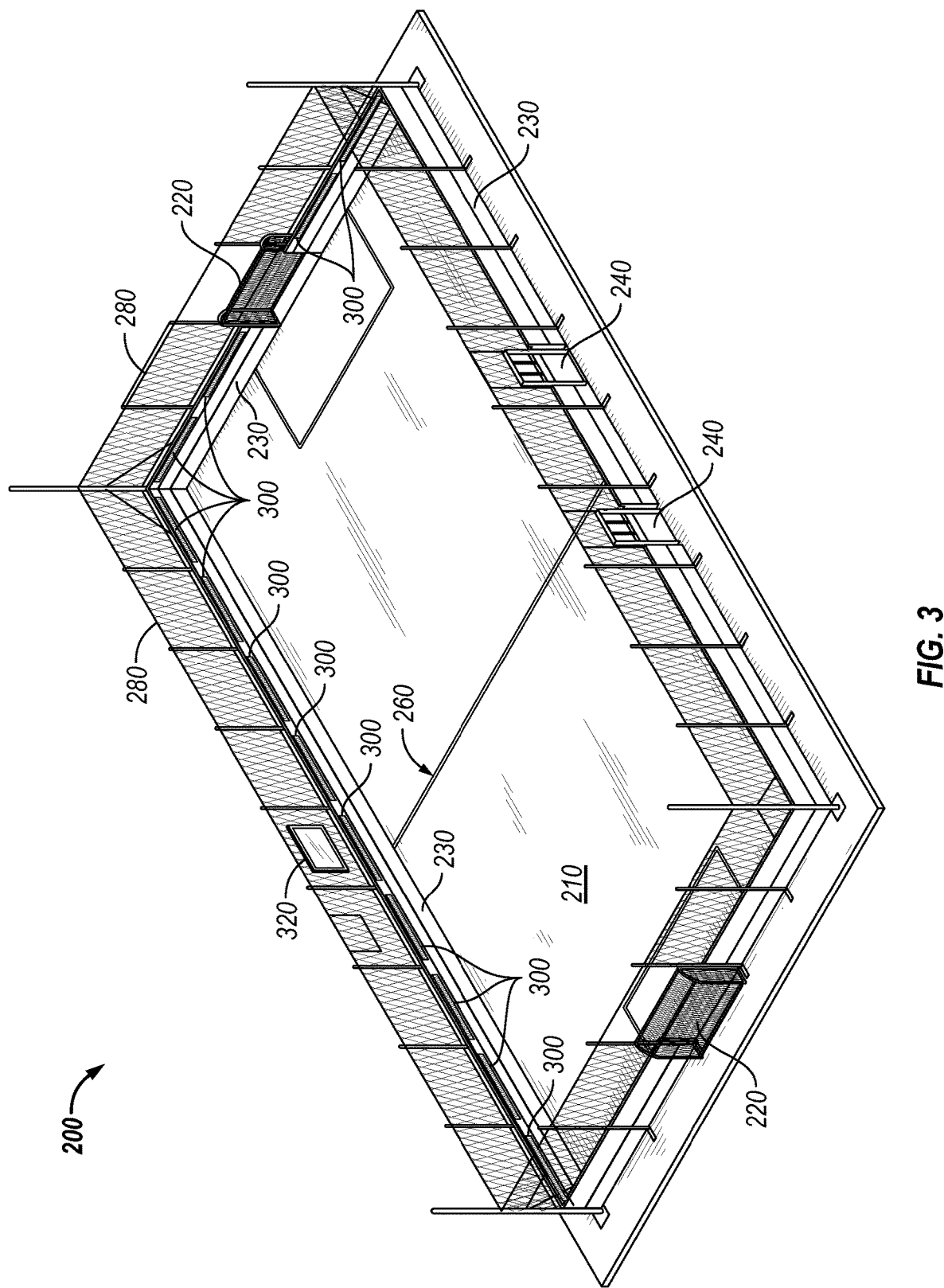
FIG. 3 shows an embodiment of a playing field.
Figure 4:
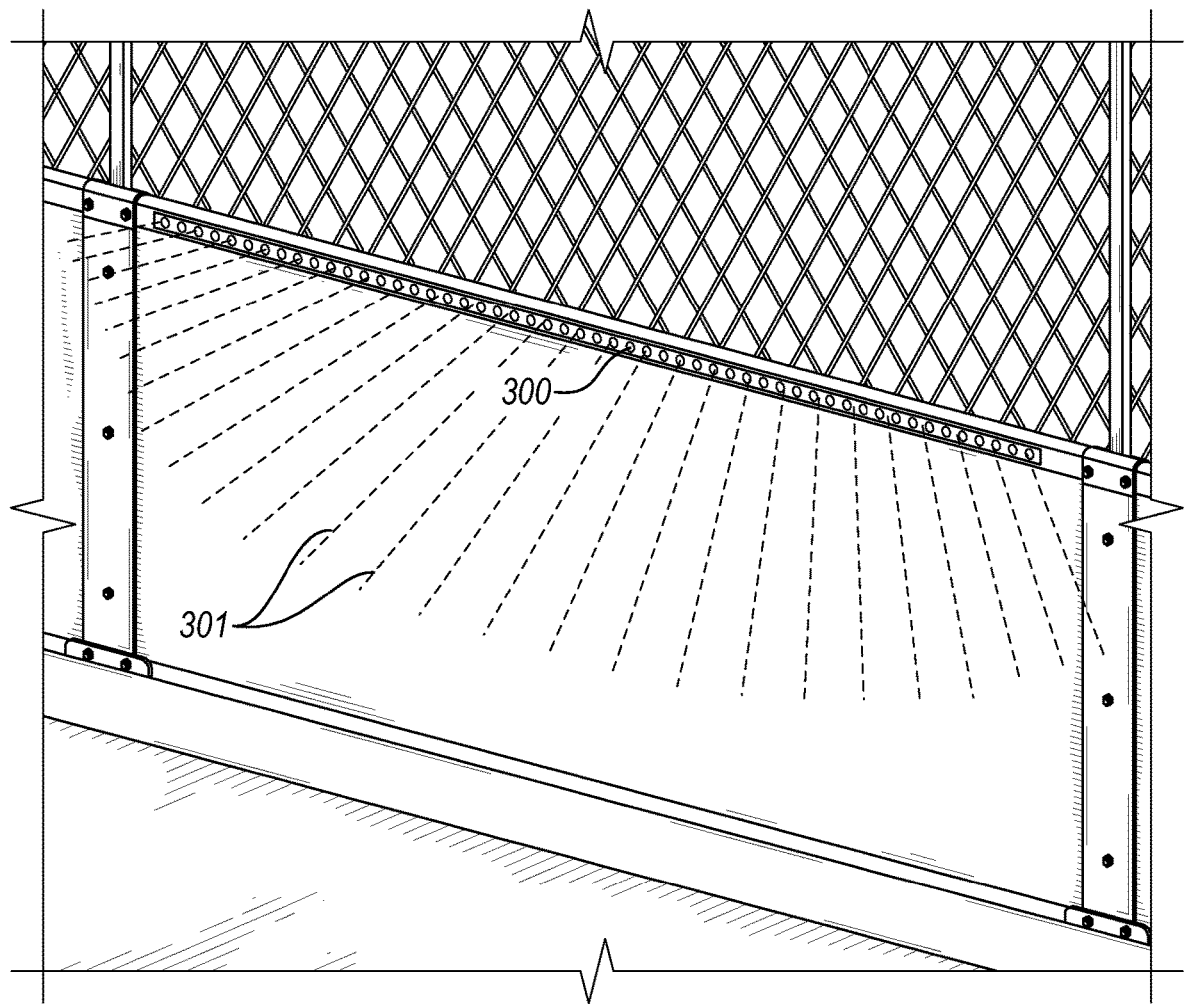
FIG. 4 shows an embodiment of a wall of playing field that includes a LED strip.

FIG. 3 shows an embodiment of a field 200 that includes a playing surface 210. The playing surface 210 may be grass, turf, ice, or the like, as would be appreciated by one of ordinary skill in the art having the benefit of this disclosure. The field 200 includes one or more doors 240 connected to a plurality of walls 230. The field 200 include two goals 220 with one goal 220 being positioned at each end of the field 200. The field 200 may include a net 280 positioned around the field 200 to potentially keep the ball 201 within the perimeter of the field 200. A plurality of LED lights 300 may be connected to one or more walls of the plurality of wall 230. As discussed herein, the wall LED lights 300 are in communication with the computer 110 and/or the controller 120. The wall LED lights 300 may emit light upon detection of a penalty by the AI referee module 125. Likewise, the wall LED lights 300 may emit light upon detection of a specified event by the event detection module 135. The controller 120 and/or computer 110 may cause the wall LED lights 300 to blink or flash upon detection of a penalty by the AI referee module 125 or the detection of a specified event by the event detection module 135. FIG. 4 shows a wall LED light 300 connected to a wall 230. The wall LED light 300 is emitting light 301.

Figure 5:
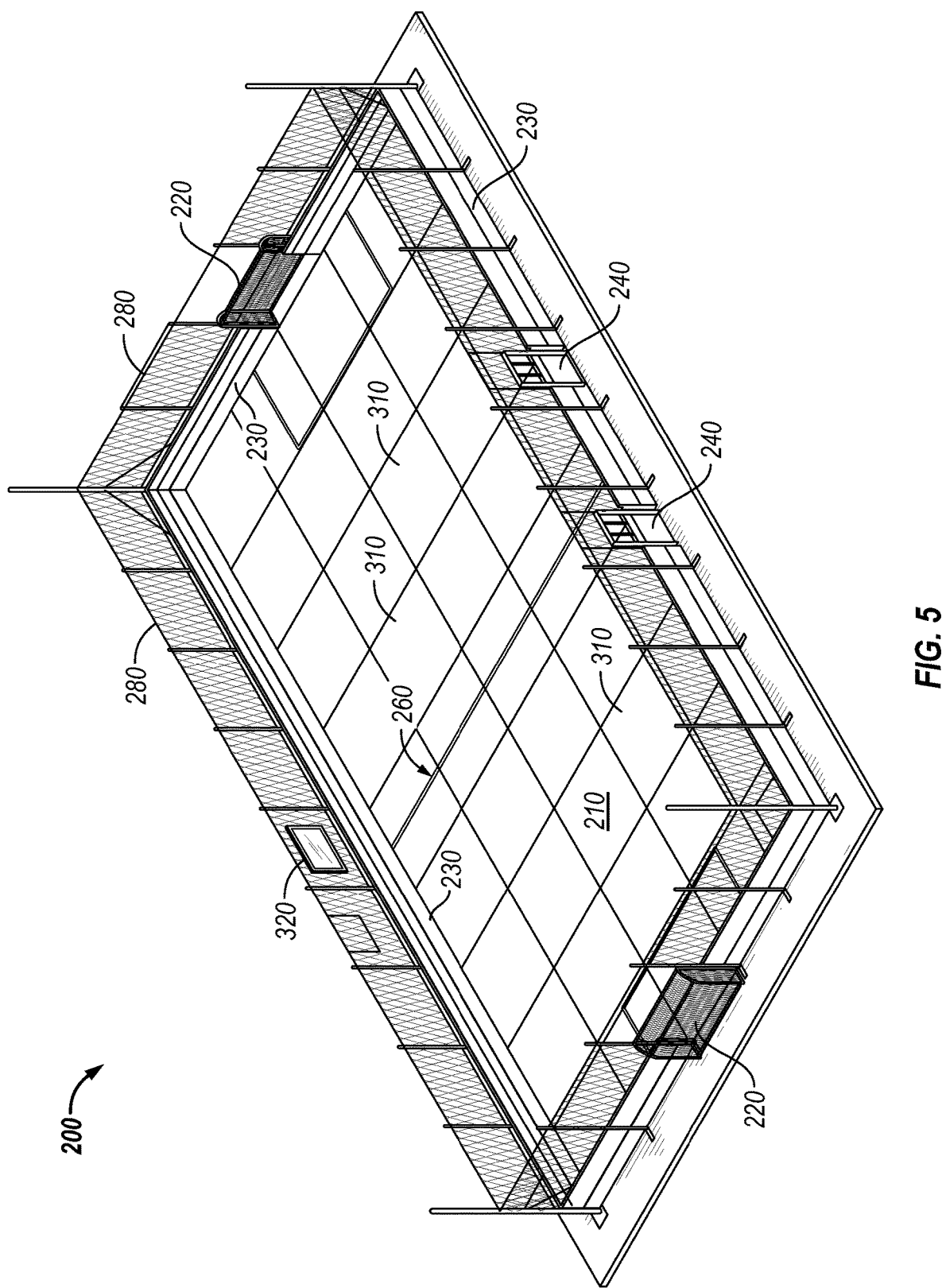
FIG. 5 shows an embodiment of a playing field that includes tiles on the playing surface.

FIG. 5 shows an embodiment of a field 200 that includes a plurality of tiles 310 that make up the playing surface 210. The plurality of tiles 310 may be floor LED tiles that are in communication with the computer 110 and/or the controller 120 via communication lines 182. Upon detection of a specified event by the event detection module 135, the computer 110 and/or controller 120 may cause the floor LED tiles 310 to emit light. The field 200 includes one or more doors 240 connected to a plurality of walls 230. The field 200 include two goals 220 with one goal 220 being positioned at each end of the field 200. The field 200 may include a net 280 positioned around the field 200 to potentially keep the ball 201 within the perimeter of the field 200. Each tile of the plurality of tiles 310 may be configured to emit more than one color of light. At least one tile of the plurality of tiles may emit light if the AI referee module 125 determines a penalty has occurred.

Figure 6:
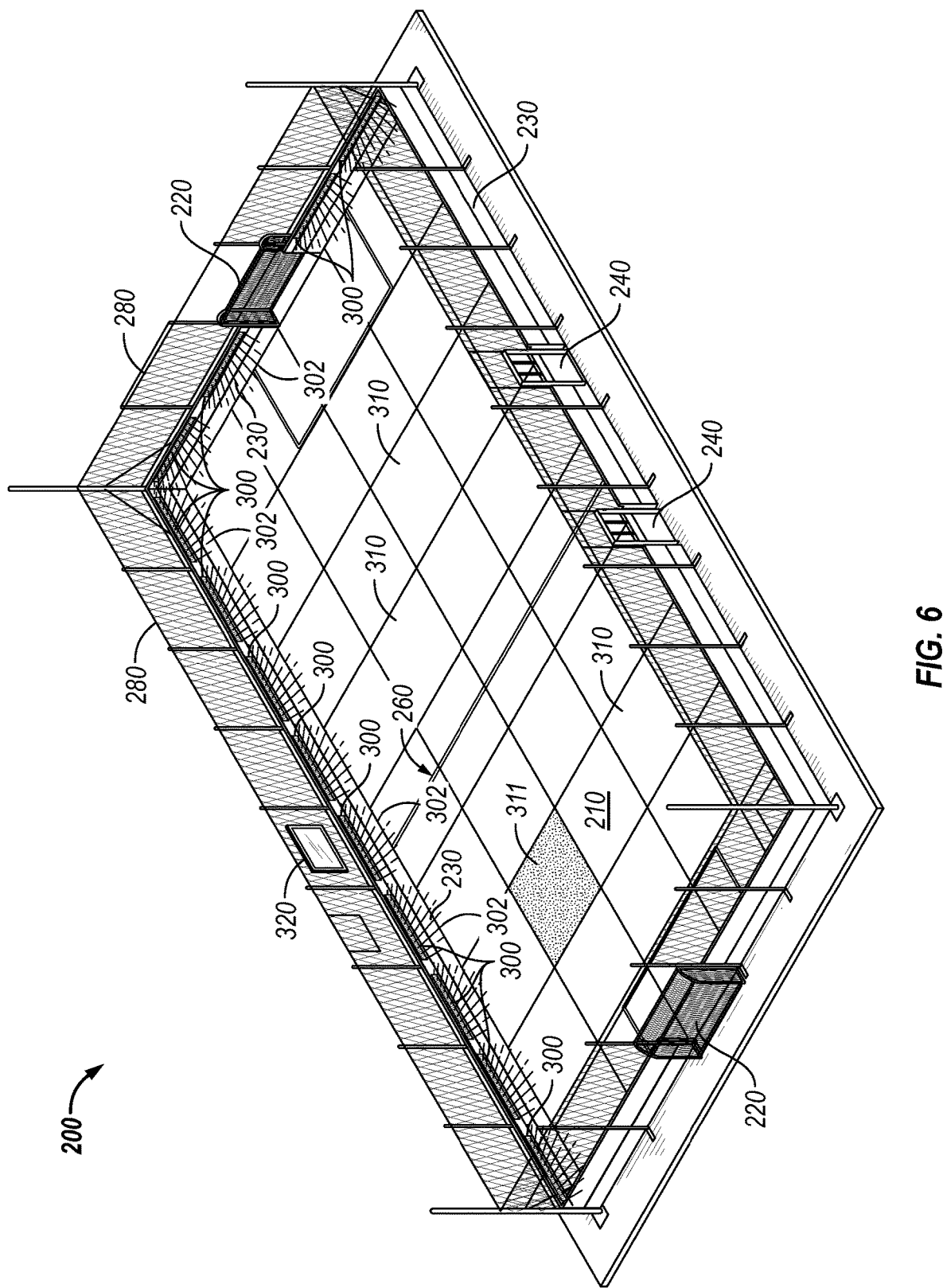
FIG. 6 shows an embodiment of an automated referee system for a playing field indicating a yellow card penalty has occurred.

FIG. 6 shows an embodiment of a field 200 in the instance that the AI referee module 125 has determine a yellow card penalty has occurred. The AI referee module 125 in combination with the computer 110 and/or control 120 may cause the wall LED lights 300 to emit yellow light 302 to indicate a yellow card penalty has occurred. The AI referee module 125 in combination with the computer 110 and/or control 120 may cause at least one LED tile 310 to emit yellow light 311 to indicate a yellow card penalty has occurred. The system 100 may cause both the wall LED lights 300 and one or more tiles 310 to emit yellow light or may cause only the wall LED lights 300 or one or more tiles 310 to emit yellow light as would be appreciated by one of ordinary skill in the art having the benefit of this disclosure.

Figure 7:
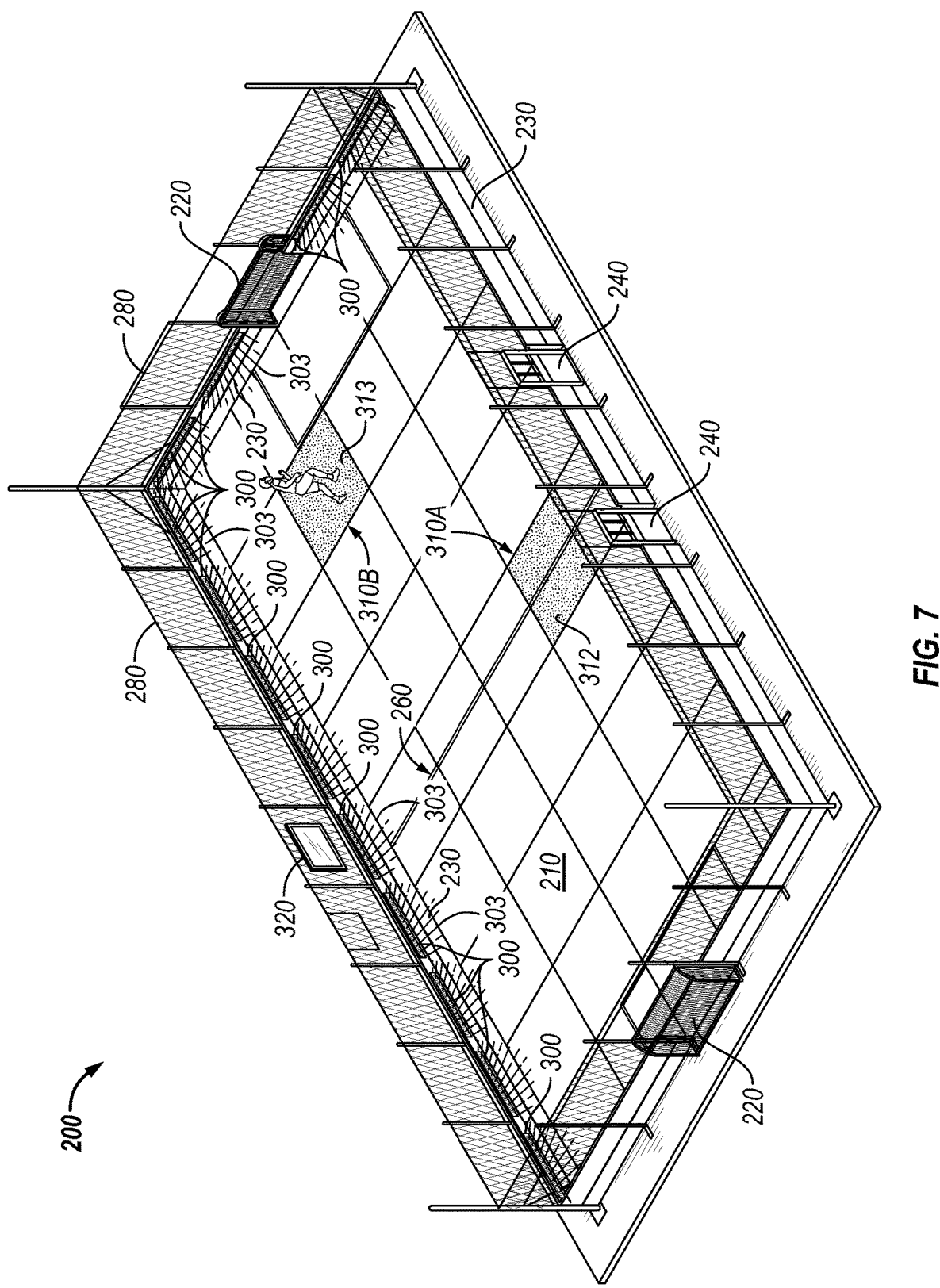
FIG. 7 shows an embodiment of an automated referee system for a playing field indicating a red card penalty has occurred.

FIG. 7 shows an embodiment of a field 200 in the instance that the AI referee module 125 has determine a red card penalty has occurred. The AI referee module 125 in combination with the computer 110 and/or control 120 may cause the wall LED lights 300 to emit red light 303 to indicate a red card penalty has occurred. The AI referee module 125 in combination with the computer 110 and/or control 120 may cause at least one LED tile 310A to emit red light 312 to indicate a red card penalty has occurred. The AI referee module 125 in combination with the computer 110 and/or control 120 may cause at least one LED tile 310B to emit red light 313 to indicate a red card penalty has occurred with the one LED tile 310B being located below the player that committed the red card penalty. The AI referee module 125 in combination with the computer 110 and/or control 120 may cause the panel 310B located underneath the player to emit red light until the player leaves the playing field 200. In other words, the system 100 causes the tile 310B that is emitting red light 313 to change to the tile located underneath the player as the player moves along the playing field 200 until the player leaves the playing field. The system 100 may use one, two, or all three of these indicators to indicate a red card penalty has occurred as would be appreciated by one of ordinary skill in the art having the benefit of this disclosure. The use of yellow light in FIG. 6 and red light in FIG. 7 to indicate yellow card and red card penalties is for illustrated purposes and may be varied as would be appreciated by one of ordinary skill in the art having the benefit of this disclosure. For example, the wall LED lights 300 and/or LED tiles 310 may be used to, but is not limited to, indicate, a foul, a flagrant foul, an intentional foul, and/or a technical foul in various games that may be played on a playing field 200.

Figure 8:
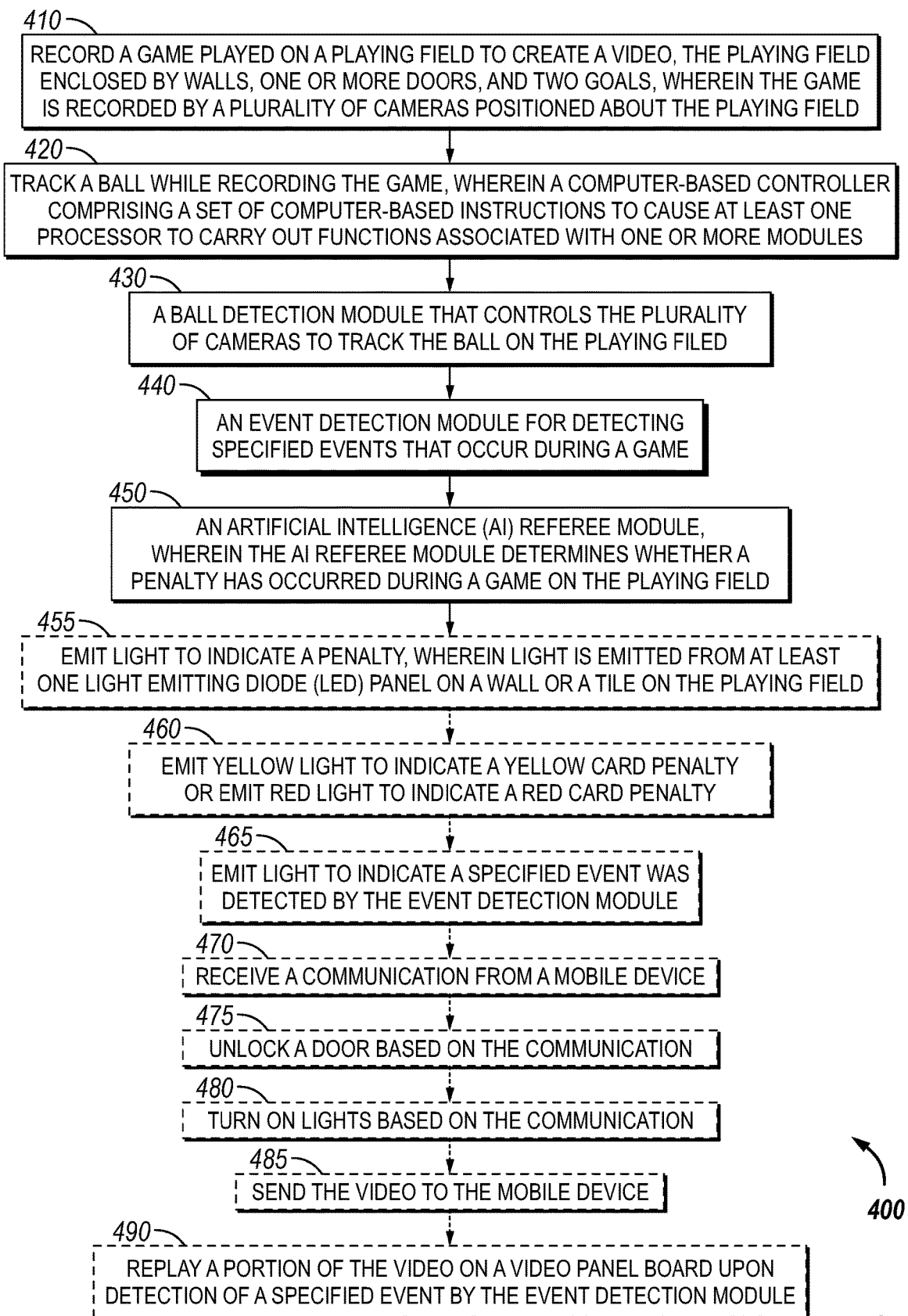
FIG. 8 shows a flow chart of embodiment of a method of the disclosure.

FIG. 8 shows is flow chart of embodiment of a method 400 of the disclosure. The method 400 includes recording a game played on a playing field 200 to create a video, the playing field enclosed by walls 230, one or more doors 240, and two goals 220, wherein the game is recorded by a plurality of cameras 150 positioned about the playing field 200, at 410. The method 400 includes tracking a ball while recoding the game, wherein a computer-based controller 120 comprising a set of computer-based instructions to cause at least one processor to carry out functions associated with one or more modules, at 420. The method 400 includes a ball detection module 115 that controls the plurality of cameras 150 to track the ball on the playing field 200, at 430. The method 400 includes an event detection module 135 for detecting specified events that occur during a game, at 440. The method 400 includes an IA referee module 125, wherein the AI referee module 125 determines whether a penalty has occurred during a game on the playing field 200, at 450.

The method 400 may include emitting light to indicate a penalty, wherein light is emitted for at least one light emitting diode (LED) panel 300 on a wall 230 or a tile 310 on the playing field 200, at 455. The method 400 may include emitting yellow light to indicate a yellow card penalty or emitting red light to indicate a red card penalty, at 460. The method 400 may include emitting light to indicate a specified event was detected by the event detection module 135, at 465. The method 400 may include receiving a communication from a mobile device 180, at 470. The method 400 may include unlocking a door based on the communication, at 475. The method 400 may include turning on lights based on the communication, at 480. The method 400 may include sending the video to the mobile device 180, at 485. The method 400 may include replaying a portion of the video on a video panel board upon detection of a specified event by the event detection module 135, at 490.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system comprising:
a playing field enclosed by walls, one or more doors, and two goals;
a plurality of cameras positioned around the playing field;
a computer-based controller in communication with the plurality of cameras, the controller comprising a set of computer-based instructions to cause at least one processor to carry out functions associated with one or more modules comprising:
a ball detection module, wherein the ball detection module controls the plurality of cameras to track a ball on the playing field to create video of a game played on the field;
an event detection module, wherein the event detection module is configured to detect specified events that occur during games played on the playing field;
an artificial intelligence (AI) referee module, wherein the AI referee module determines whether a penalty has occurred during a game occurring on the playing field; wherein the AI referee module may be trained using machine learning; and
one or more light emitting diode (LED) lights on the walls, wherein the one or more LED lights may emit more than one color of light, wherein the one or more LED lights emit light if the AI referee module determines a penalty has occurred.

2. The system of claim 1, wherein the one or more LED lights emit yellow light if the AI referee module determines a yellow card should be applied for the penalty and wherein the one or more LED lights emit red light if the AI referee module determines a red card should be applied for the penalty.

3. The system of claim 2, wherein the one or more LED lights emit light when the event detection module detects a specified event during a game played on the playing field.

4. The system of claim 3, wherein the specified event comprises a shot on goal, a score, or a skill move.

5. The system of claim 1, wherein the plurality of cameras include at least one camera positioned above each goal, at least one camera positioned at each corner of the playing field, and at least two cameras positioned at a centerline of the playing field.

6. The system of claim 1, further comprising at least one a video board panel, wherein when the event detection module detects a specified event during a game played on the playing field a replay of the detected specified event is displayed on the video board panel.

7. The system of claim 6, further comprising lights and a door lock, wherein a mobile device may be used to operate the lights and the door lock.

8. The system of claim 7, wherein the computer-based controller is configured to send video of a game played on the playing field to the mobile device.

9. A system comprising:
a playing field enclosed by walls, one or more doors, and two goals;
a plurality of cameras positioned around the playing field;
a computer-based controller in communication with the plurality of cameras, the controller comprising a set of computer-based instructions to cause at least one processor to carry out functions associated with one or more modules comprising:
a ball detection module, wherein the ball detection module controls the plurality of cameras to track a ball on the playing field to create video of a game played on the field;

an event detection module, wherein the event detection module is configured to detect specified events that occur during games played on the playing field;

an artificial intelligence (AI) referee module, wherein the AI referee module determines whether a penalty has occurred during a game occurring on the playing field; wherein the AI referee module may be trained using machine learning; and wherein the playing field further comprises a plurality of tiles and wherein the plurality of tiles are configured to emit more than one color of light, wherein at least one tile of the plurality of tiles emits light if the AI referee module determines a penalty has occurred.

10. The system of claim 9, wherein one tile of the plurality of tiles emits yellow light if the AI referee module determines a yellow card should be applied for the penalty and wherein one tile of the plurality of tiles emits red light if the AI referee module determines a red card should be applied for the penalty.

11. The system of claim 10, wherein the tile is located under a player that committed the red card penalty and the tile emits red light until the player leaves the playing field.

12. A method comprising:

recording a game played on a playing field to create a video, the playing field enclosed by walls, one or more doors, and two goals, wherein the game is recorded by a plurality of cameras positioned about the playing field;

tracking a ball while recording the game, wherein a computer-based controller comprising a set of computer-based instructions to cause at least one processor to carry out functions associated with one or more modules comprising:

a ball detection module that controls the plurality of cameras to track the ball on the playing field;

an event detection module for detecting specified events that occur during a game; and an artificial intelligence (AI) referee module, wherein the AI referee module determines whether a penalty has occurred during a game occurring on the playing field; and emitting light to indicate a penalty, wherein light is emitted from at least one light emitting diode (LED) panel on a wall or a tile on the playing field.

13. The method of claim 12, wherein emitting light to indicate the penalty further comprises emitting yellow light to indicate a yellow card penalty or emitting red light to indicate a red card penalty.

14. The method of claim 13, further comprising emitting light to indicate a specified event was detected by the event detection module.

15. The method of claim 14, further comprising:
receiving a communication from a mobile device;
unlocking a door based on the communication; and
turning on lights based on the communication.

16. The method of claim 15, further comprising sending the video to the mobile device.

17. The method of claim 16, further comprising replaying a portion of the video on a video panel board upon detection of a specified event by the event detection module.

* * * * *